US006966218B2

(12) United States Patent
Oki et al.

(10) Patent No.: US 6,966,218 B2
(45) Date of Patent: Nov. 22, 2005

(54) APPARATUS FOR DETECTING LEAKAGE IN AN EVAPORATED FUEL PROCESSING SYSTEM

(75) Inventors: Hideyuki Oki, Saitama (JP); Takashi Yamaguchi, Saitama (JP); Tomohiro Yamagami, Saitama (JP); Eisaku Gosyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 10/674,798

(22) Filed: Oct. 1, 2003

(65) Prior Publication Data

US 2004/0163452 A1 Aug. 26, 2004

(30) Foreign Application Priority Data

Oct. 9, 2002 (JP) ............................ 2002-296661
Jun. 24, 2003 (JP) ............................ 2003-180125

(51) Int. Cl.[7] ........................ G01M 19/00; G01M 3/04
(52) U.S. Cl. ........................ 73/118.1; 73/40; 73/40.5 R
(58) Field of Search .............................. 73/40, 40.5 R, 73/49.2, 118.1

(56) References Cited

U.S. PATENT DOCUMENTS 4,505,248 A * 3/1985 Yuzawa et al. ............. 123/519
5,967,125 A * 10/1999 Morikawa ................... 123/520
6,073,487 A * 6/2000 Dawson ..................... 73/118.1
6,343,505 B1 * 2/2002 Cook et al. ................ 73/118.1
6,357,288 B1 * 3/2002 Shigihama et al. ........ 73/118.1
6,477,889 B2 * 11/2002 Yamaki ................... 73/40.5 R
6,502,560 B1 * 1/2003 Perry ......................... 123/519
6,698,280 B1 * 3/2004 Iden et al. ................. 73/118.1
6,807,851 B2 * 10/2004 Wakahara et al. ......... 73/118.1

FOREIGN PATENT DOCUMENTS

JP 11-336626 12/1999

* cited by examiner

*Primary Examiner*—Michael Cygan
(74) *Attorney, Agent, or Firm*—Arent Fox PLLC

(57) ABSTRACT

An apparatus for determining leakage in an evaporated fuel processing system is provided. The evaporated fuel processing system extends from a fuel tank through a canister to a purge passage through which evaporated fuel from the fuel tank is purged to an intake manifold of an engine. The canister comprises a vent-shut valve that communicates with the atmosphere. The apparatus comprises a pressure sensor for detecting a pressure of the evaporated fuel processing system and a control unit connected to the pressure sensor. The control unit detects a stop of the engine. After the stop of the engine is detected, the control unit closes the vent-shut valve to close the evaporated fuel processing system. The control unit determines whether the evaporated fuel processing system has leakage after the evaporated fuel processing system is closed based on the detected pressure and a predetermined determination value. The control unit prohibits the leakage determination if the detected pressure is not within a predetermined range. Thus, it is prevented that a state occurs where the vent-shut valve does not open due to the pressure of the evaporated fuel processing system when the leakage determination is being performed.

16 Claims, 8 Drawing Sheets

(a)

(b)

APPARATUS FOR DETECTING LEAKAGE IN AN EVAPORATED FUEL PROCESSING SYSTEM

BACKGROUND OF THE INVENTION

The present invention relates to an apparatus for detecting leakage in an evaporated fuel processing system after an internal-combustion engine is stopped.

Various approaches have been proposed for detecting leakage in an evaporated fuel processing system after an internal-combustion engine is stopped. According to one of such approaches (for example, refer to the Japanese Patent Application Unexamined Publication No. 11-336626), an evaporated fuel processing system is placed under a negative pressure after the engine is stopped. It is determined whether the system has leakage based on a change in the pressure of the system.

A canister is provided in the evaporated fuel processing system for adsorbing evaporated fuel generated in a fuel tank. The canister has a passage that communicates with the atmosphere, in which an open-to-atmosphere valve (which is referred to as "vent-shut valve") is disposed. The vent-shut valve is usually kept in an open state. When leakage determination for the evaporated fuel processing system is performed, the vent-shut valve is opened/closed in accordance with a control signal from a control unit.

If the pressure in the evaporated fuel processing system becomes higher than a predetermined positive pressure, or if the pressure in the system becomes lower than a predetermined negative pressure, the vent-shut valve of the canister hardly opens. If the vent-shut valve does not open, the leakage determination cannot be stably performed.

Thus, there is a need for an apparatus and a method capable of prohibiting the leakage determination when a state in which the vent-shut valve of the canister does not open is detected.

SUMMARY OF THE INVENTION

According to one aspect of the invention, an apparatus for determining leakage in an evaporated fuel processing system is provided. The evaporated fuel processing system extends from a fuel tank through a canister to a purge passage through which evaporated fuel from the fuel tank is purged to an intake manifold of an engine. The canister comprises a vent-shut valve that communicates with the atmosphere. The apparatus comprises a pressure sensor for detecting a pressure of the evaporated fuel processing system and a control unit connected to the pressure sensor. The control unit is configured to detect a stop of the engine. After the stop of the engine is detected, the control unit closes the vent-shut valve to close the evaporated fuel processing system. The control unit determines whether the evaporated fuel processing system has leakage after the evaporated fuel processing system is closed based on the detected pressure and a predetermined determination value. The control unit prohibits the leakage determination if the detected pressure is not within a predetermined range.

The pressure beyond the predetermined range may make it impossible to open the vent-shut valve (or open-to-atmosphere valve) of the canister. According to the invention, it is prevented that a state in which the vent-shut valve does not open occurs when the leakage determination is being performed.

According to one embodiment of the invention, the predetermined range is defined based on a pressure range within which the vent-shut valve can open. Since the vent-shut valve surely opens when the leakage determination is being performed, the leakage determination is stably performed.

According to one embodiment of the invention, the pressure range within which the vent-shut valve can open is defined by a biasing force of a spring provided in the vent-shut valve.

According to one embodiment of the invention, the spring of the vent-shut valve is provided in the atmosphere side relative to a valve seat at which the vent-shut valve is seated. The control unit is further configured to prohibit the leakage determination if the detected pressure is greater than a predetermined positive pressure.

The evaporated fuel processing system may exhibit an excessive positive pressure. In order to open the vent-shut valve in which the spring of the vent-shut valve is provided in the atmosphere side relative to the valve seat, the biasing force of the spring needs to overcome the positive pressure of the evaporated fuel processing system. According to the invention, if the evaporated fuel processing system exhibits an excessive positive pressure, the leakage determination is prohibited. It is prevented that a state in which the vent-shut valve does not open occurs when the leakage determination is being performed.

According to one embodiment of the invention, the vent-shut valve is provided in the canister side relative to the valve seat. The control unit is further configured to prohibit the leakage determination if the detected pressure is less than a predetermined negative pressure.

The evaporated fuel processing system may exhibit an excessive negative pressure. In order to open the vent-shut valve when the spring of the vent-shut valve is provided in the canister side relative to the valve seat, the biasing force of the spring needs to overcome the negative pressure of the evaporated fuel processing system. According to the invention, if the evaporated fuel processing system exhibits an excessive negative pressure, the leakage determination is prohibited. It is prevented that a state in which the vent-shut valve does not open occurs when the leakage determination is being performed.

DESCRIPTION OF THE PREFERRED EMBODIMENTS

Figure 1:
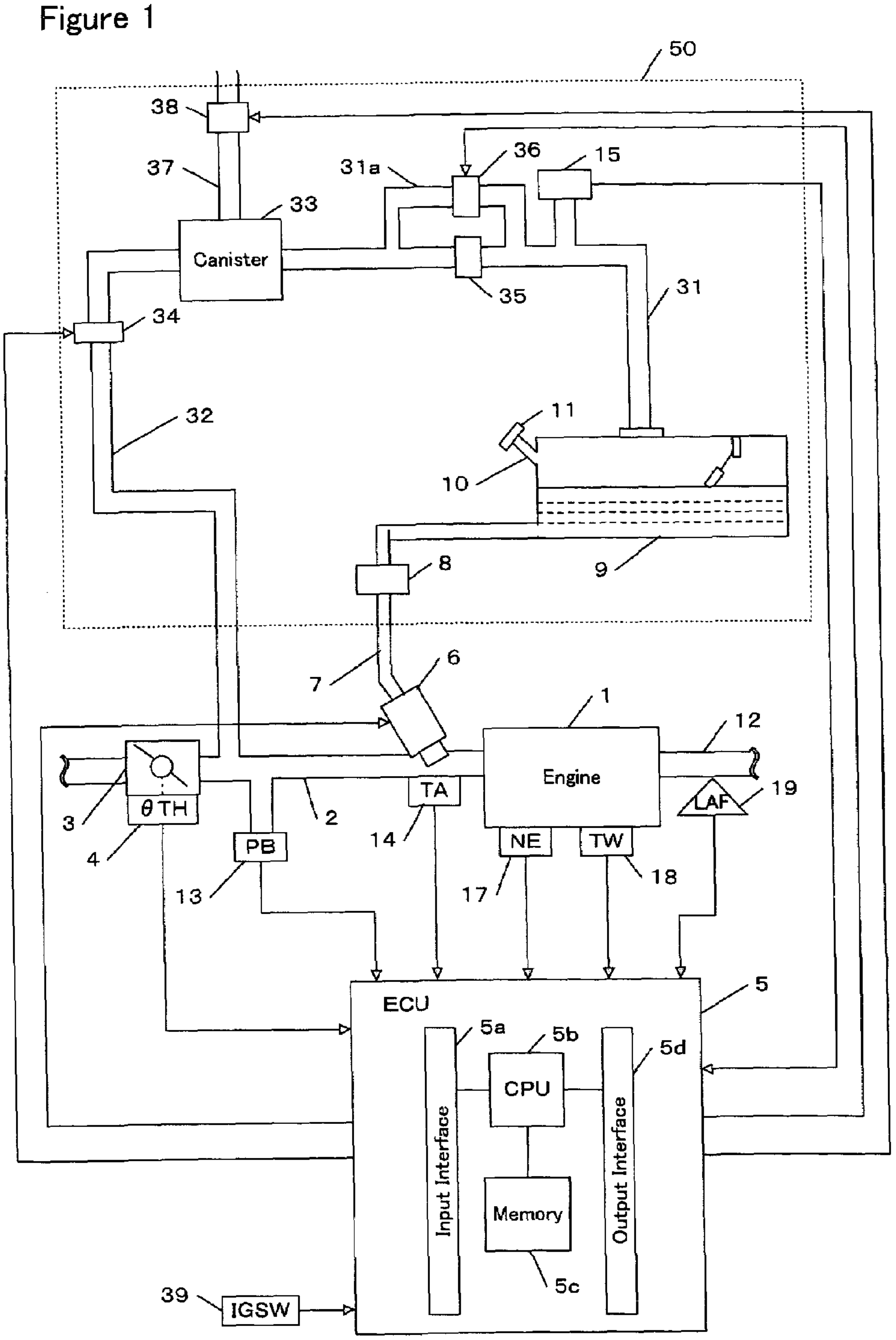
FIG. 1 schematically shows an evaporated fuel processing apparatus and a controller for an internal-combustion engine in accordance with one embodiment of the invention.

Referring to the drawings, specific embodiments of the invention will be described. FIG. 1 is a block diagram showing an engine and its controller in accordance with one embodiment of the invention.

An electronic control unit (hereinafter referred to as an ECU) 5 comprises an input interface 5*a* for receiving data sent from each part of the engine 1, a CPU 5*b* for carrying out operations for controlling each part of the engine 1, a memory 5*c* including a read only memory (ROM) and a random access memory (RAM), and an output interface 5*d* for sending control signals to each part of the engine 1. Programs and various data for controlling each part of the vehicle are stored in the ROM. A program for performing a leakage determination process according to the invention, data and tables used for operations of the program are stored in the ROM. The ROM may be a rewritable ROM such as an EEPROM. The RAM provides work areas for operations by the CPU 5*a*, in which data sent from each part of the engine 1 as well as control signals to be sent out to each part of the engine 1 are temporarily stored.

The engine 1 is, for example, an engine equipped with four cylinders. An intake manifold 2 is connected to the engine 1. A throttle valve 3 is disposed upstream of the intake manifold 2. A throttle valve opening (θ TH) sensor 4, which is connected to the throttle valve 3, outputs an electric signal corresponding to an opening angle of the throttle valve 3 and sends the electric signal to the ECU 5.

A fuel injection valve 6 is installed for each cylinder at an intermediate point in the intake manifold 2 between the engine 1 and the throttle valve 3. The opening time of each injection valve 6 is controlled by a control signal from the ECU 5. A fuel supply line 7 connects the fuel injection valve 6 and the fuel tank 9. A fuel pump 8 provided at an intermediate point in the fuel supply line 7 supplies fuel from the fuel tank 9 to the fuel injection valve 6. A regulator (not shown) that is provided between the pump 8 and the fuel injection valve 6 acts to maintain the differential pressure between the pressure of the air taken in from the intake manifold 2 and the pressure of the fuel supplied via the fuel supply line 7 at a constant value. In cases where the pressure of the fuel is too high, the excess fuel is returned to the fuel tank 9 via a return line (not shown).

Thus, the air taken in via the throttle valve 3 passes through the intake manifold 2. The air is mixed with the fuel injected from the fuel injection valves 6, and is then supplied to the cylinders of the engine 1.

A fuel entry 10 for refueling is provided in the tank 9. A filler cap 11 is attached to the fuel entry 10.

An intake manifold pressure (PB) sensor 13 and an outside air temperature (TA) sensor 14 are mounted in the intake manifold 2 downstream of the throttle valve 3. These sensors convert the intake manifold pressure and outside air temperature into electrical signals, and send these signals to the ECU 5.

A rotational speed (Ne) sensor 17 is attached to the periphery of the camshaft or the periphery of the crankshaft (not shown) of the engine 1, and outputs a CRK signal pulse at a predetermined crank angle cycle (for example, a cycle of 30 degrees) that is shorter than a TDC signal pulse cycle issued at a crank angle cycle associated with a TDC position of the piston. CRK pulses are counted by the ECU 5 to determine the rotational speed Ne of the engine 1.

An engine water temperature (TW) sensor 18 is attached to the cylinder peripheral wall, which is filled with cooling water, of the cylinder block of the engine 1. The sensor 18 detects the temperature of the engine cooling water and sends it to the ECU 5.

The engine 1 has an exhaust manifold 12, and exhaust gas is discharged via a ternary catalyst (not shown) constituting an exhaust gas cleansing device, which is installed at an intermediate point in the exhaust manifold 12. A LAF sensor 19 mounted at an intermediate point in the exhaust manifold 12 is a full range air-fuel ratio sensor. The LAF sensor 19 detects the oxygen concentration in the exhaust gas in a wide air-fuel ratio zone, from a rich zone where the air-fuel ratio is richer than the theoretical air-fuel ratio to an extremely lean zone. The detected signal is sent to the ECU 5.

An ignition switch 39 is connected to the ECU 5. A switching signal issued by the ignition switch 39 is sent to the ECU 5.

An evaporated fuel processing system 50 will be described. The system 50 comprises a fuel tank 9, charge passage 31, bypass passage 31*a*, canister 33, purge passage 32, two-way valve 35, bypass valve 36, purge control valve 34, passage 37, and vent-shut valve 38.

The fuel tank 9 is connected to the canister 33 via the charge passage 31 so that evaporated fuel from the fuel tank 9 can move into the canister 33. The two-way valve 35 is disposed in the charge passage 31. The two-way valve 35 has a positive-pressure valve that opens when the tank pressure is greater than the atmospheric pressure by a first predetermined pressure, and a negative-pressure valve that opens when the tank pressure is less than the pressure of the canister 33 by a second predetermined pressure.

The bypass passage 31*a* that bypasses the two-way valve 35 is provided. The bypass valve 36 is an electromagnetic valve and is disposed in the bypass passage 31*a*. The bypass valve 36 is ordinarily in a closed state. The bypass valve 36 is opened according to a control signal from the ECU 5.

The pressure sensor 15 is disposed between the two-way valve 35 and the fuel tank 9. The output of the pressure sensor is sent to the ECU 5. The output PTANK of the pressure sensor 15 is equal to the pressure within the fuel tank in a state in which the pressure within the fuel tank 9 and the pressure within the canister 33 are stable. When the pressure within the canister 33 or the fuel tank 9 is changing, the output PTANK of the pressure sensor 15 indicates a pressure different from the actual tank pressure. The output of the pressure sensor 15 is hereinafter referred to as "tank internal pressure PTANK."

The canister 33 contains active carbon that adsorbs the evaporated fuel. The canister 33 has an air intake port (not shown in the figure) that communicates with the atmosphere via the passage 37. The vent-shut valve 38 is disposed at an intermediate point in the passage 37. The vent-shut valve 38 is an electromagnetic valve controlled by the ECU 5. The vent-shut valve 38 is opened when the tank is refueled or when evaporated fuel is purged. The vent-shut valve 38 is also opened/closed when the leakage determination, which is described later, is performed. The vent-shut valve 38 is in an open state when it is not driven by a control signal from the ECU 5.

The canister 33 is connected with the intake manifold 2 on the downstream side of the throttle valve 3 via the purge passage 32. The purge control valve 34, which is an electromagnetic valve, is provided at an intermediate point in the purge passage 32. The fuel adsorbed in the canister 33 is appropriately purged to the intake system of the engine via the purge control valve 34. The purge valve 34 continuously controls the flow rate by altering the on/off duty ratio based on a control signal from the ECU 5.

If a large amount of evaporated fuel is generated when the tank is refueled, the two-way valve 35 is opened and the evaporated fuel is absorbed in the canister 33. In a predetermined operating state of the engine 1, a duty ratio of the purge control valve 34 is controlled so that an appropriate amount of evaporated fuel is supplied to the intake manifold 2 from the canister 33.

Signals sent to the ECU 5 are passed to the input interface 5*a*. The input interface 5*a* shapes the input signal waveforms, corrects the voltage levels to specified levels, and converts analog signal values into digital signal values. The CPU 5*b* processes the resulting digital signals, performs operations in accordance with the programs stored in the ROM 5*c*, and creates control signals. The output interface 5*d* sends these control signals to the fuel injection valve 6, the purge control valve 34, the bypass valve 36, and the vent-shut valve 38.

According to the embodiment, during the leakage determination after the ignition switch 39 is turned off, the ECU 5, bypass valve 36, and vent-shut valve 38 are supplied with electric power. The purge control valve 34 is not supplied with electric power after the ignition switch 39 is turned off. The purge control valve 34 is held in a closed state.

Figure 2:
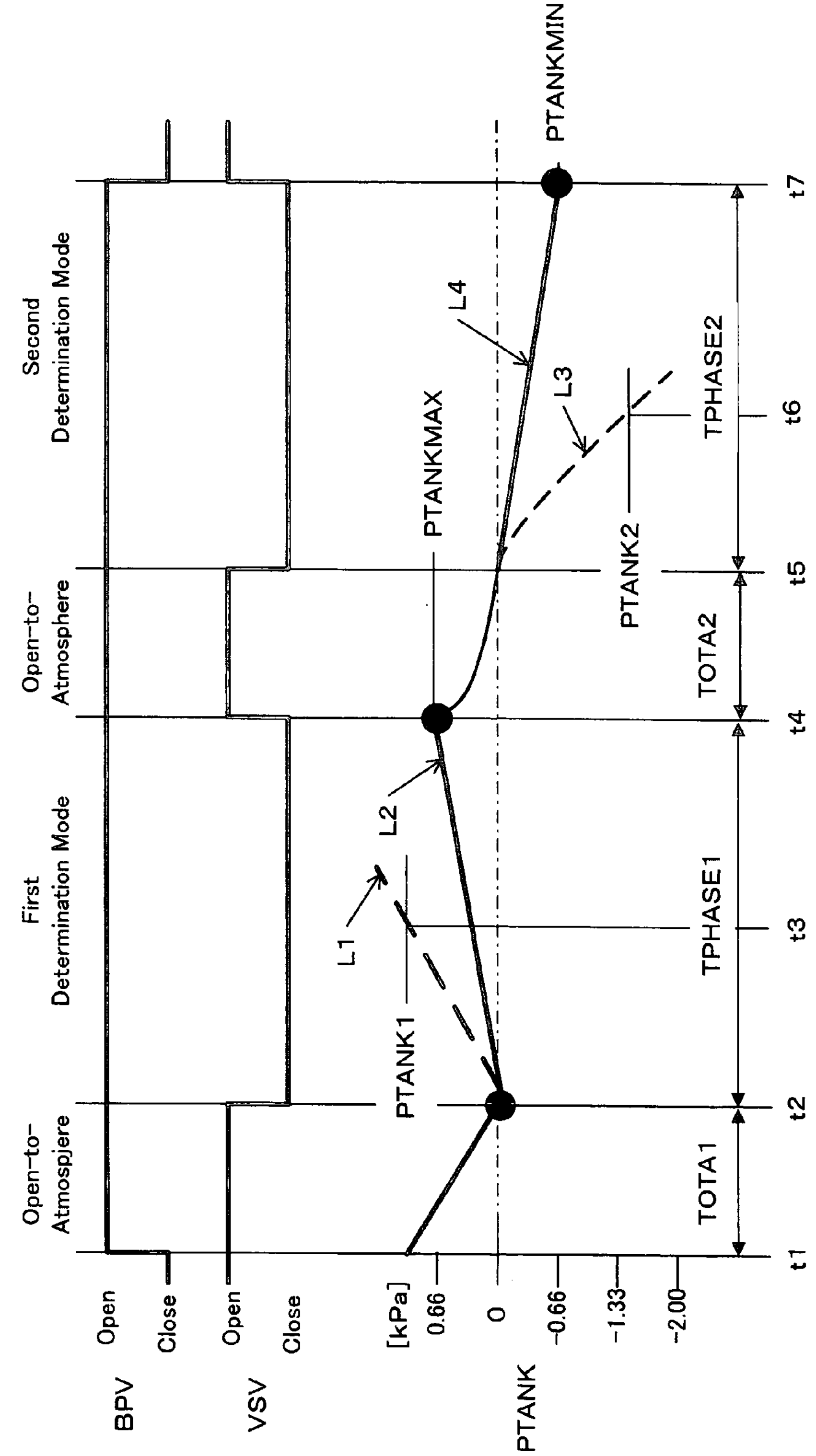
FIG. 2 schematically shows a time chart for leakage determination in accordance with one embodiment of the invention.

FIG. 2 shows a time chart of the leakage determination performed after the engine is stopped. The tank internal pressure PTANK is actually detected as an absolute pressure. However, in the time chart, the tank internal pressure is represented as a differential pressure with respect to the atmospheric pressure.

When the engine is stopped at time t1, the bypass valve 36 is opened and the vent-shut valve 38 is held in an open state. The evaporated fuel processing system 50 is opened to the atmosphere. The tank internal pressure PTANK becomes equal to the atmospheric pressure. The purge control valve 34 is closed when the engine is stopped. A first open-to-atmosphere period continues over a predetermined period TOTAL (for example, 120 seconds).

At time t2, the vent-shut valve 38 is closed and a first determination mode is started. In the first determination mode, the evaporated fuel processing system 50 is placed in a closed state. The first determination mode continues over a first determination period TPHASE1 (for example, 900 seconds). If the tank internal pressure PTANK exceeds a first determination value PTANK1 (for example, "atmospheric pressure+1.3 kPa (10 mmHg)") as shown by a dashed line L1, it is determined that there is no leakage in the evaporated fuel processing system 50 (at time t3). On the other hand, if the tank internal pressure PTANK does not reach the first determination value PTANK1 as shown by a solid line L2, the maximum tank internal pressure PTANKMAX is stored (at time t4).

Immediately after the engine is stopped, the temperature of the evaporated fuel processing system may increase because of heat from the exhaust gas and the engine. If the temperature of the evaporated fuel processing system 50 increases in the first determination mode, more evaporated fuel is generated, which causes the tank internal pressure PTANK to increase toward the positive side.

On the other hand, if the evaporated fuel processing system is cooled with outside air immediately after the engine is stopped, the temperature of the evaporated fuel processing system may decrease. If the temperature of the evaporated fuel processing system 50 decreases in the first determination mode, the tank internal pressure PTANK decreases toward the negative side.

Thus, at time t4 at which the first determination mode is completed, the tank internal pressure PTANK may be either a positive pressure or a negative pressure in accordance with a state of the evaporated fuel processing system.

At time t4, the vent-shut valve 38 is opened to open the evaporated processing system to the atmosphere. A second open-to-atmosphere period continues over a predetermined period TOTA2 (for example, 120 seconds).

At time t5, the vent-shut valve 38 is closed and a second determination mode is started. The second determination mode continues over a second determination period TPHASE2 (for example, 2400 seconds). The second determination mode is performed when the engine is almost cooled with outside air. Therefore, the temperature of the evaporated fuel processing system usually decreases in the second determination mode. Since the temperature of the evaporated fuel processing system decreases, the pressure of the evaporated fuel processing system decreases.

If the tank internal pressure PTANK becomes lower than a second determination value PTANK2 (for example, "atmospheric pressure —1.3 kPa (10 mmHg)") as shown by a dashed line L3, it is determined that there is no leakage in the evaporated fuel processing system 50 (at time t6). On the other hand, if the tank internal pressure PTANK changes as shown by a solid line L4, the minimum tank internal pressure PTANKMIN is stored (at time t7). At time t7, the bypass valve 36 is closed and the vent-shut valve 38 is opened.

If there is leakage in the evaporated fuel processing system 50, a change in the tank internal pressure PTANK with respect to the atmospheric pressure is small. Leakage can be detected based on a difference ΔP between the stored maximum tank internal pressure PTANKMAX and the stored minimum tank internal pressure PTANKMIN. If the difference ΔP is greater than a third determination value ΔPTH, it is determined that there is no leakage in the evaporated fuel processing system 50. If the difference ΔP is equal to or less than the third determination value ΔPTH, it is determined that there is leakage in the evaporated fuel processing system 50.

Figure 3:
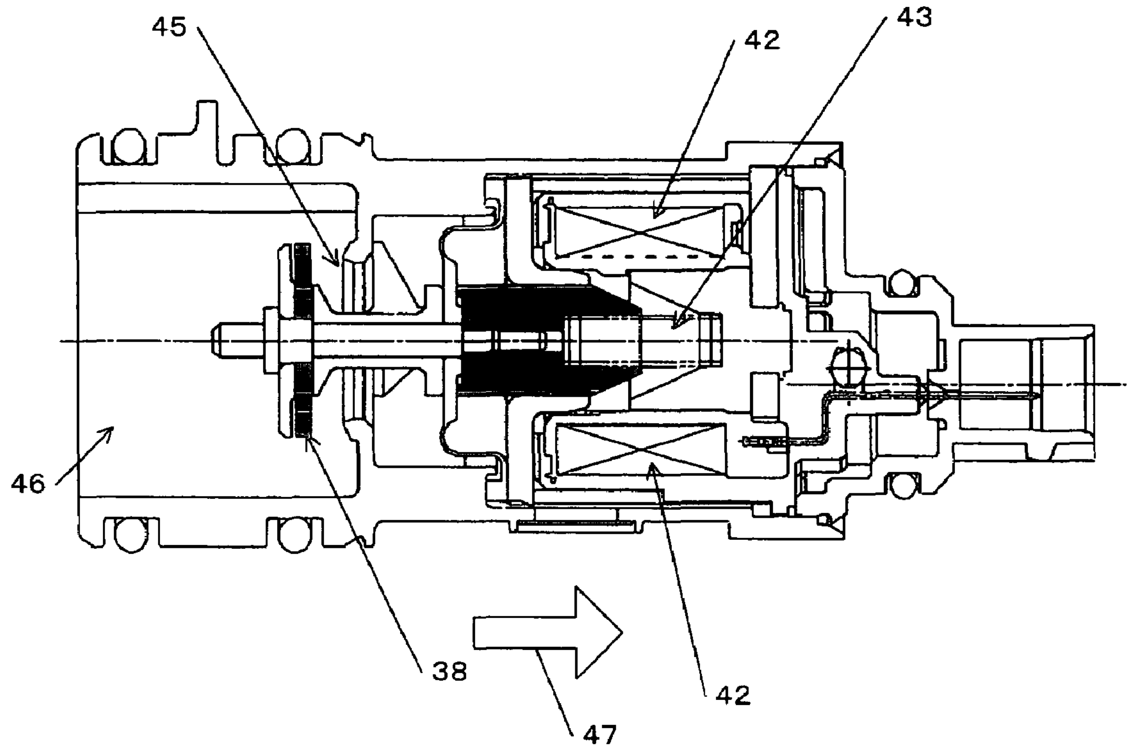
FIG. 3 shows a structure of a vent-shut valve in accordance with a first embodiment of the present invention.

FIG. 3 shows a structure of a vent-shut valve 38 in accordance with a first embodiment of the present invention. As described above, the vent-shut valve 38 is used for maintaining the pressure in the evaporated fuel processing system. The vent-shut valve 38 is also used for releasing the maintained pressure.

FIG. 3 shows a state in which the vent-shut valve 38 is in an open state. If electric power is supplied to an electromagnet 42 when the vent-shut valve 38 is in an open state, the valve 38 is pulled toward a direction shown by arrow 47 against the biasing force of a spring 43. When the valve 38 is seated at a valve seat 45, a passage 46 to the canister is closed. Thus, the pressure inside the canister is maintained.

If the electric power supply to the electromagnet 42 is stopped when the pressure in the canister is maintained, the valve 38 moves to the left of the figure (that is, the opposite direction of the arrow 47) in accordance with the biasing force of the spring 43. When the valve 38 leaves the valve seat 45, the passage 46 to the canister is opened.

At the time t4 when the first determination mode is completed, the vent-shut valve 38 needs to be opened. The valve 38 is opened only by the biasing force of the spring 43. When the tank internal pressure PTANK is a positive pressure at the time t4, the valve 44 does not open unless the biasing force of the spring 43 is greater than a force caused by this positive pressure. The force caused by the positive pressure is specifically shown by "the positive pressure×the area of the valve 38."

For example, if the pressure of the evaporated fuel processing system is less than 2.66 kPa (20 mmHg), the biasing force of the spring 43 is greater than the force caused by the pressure of the evaporated fuel processing system. Therefore, the valve opens. If the pressure of the evaporated fuel processing system is greater than 2.66 kPa (20 mmHg), the vent-shut valve does not open because the biasing force of the spring 43 cannot overcome the force caused by the positive pressure of the evaporated fuel processing system.

If the structure of the vent-shut valve 38 is determined, a positive pressure making it impossible to open the vent-shut valve can be pre-measured. According to the present invention, when the pressure in the evaporated fuel processing system exceeds a positive pressure that makes it impossible to open the vent-shut valve, the leakage determination is prohibited. Thus, it is prevented that a state in which the vent-shut valve 38 does not open occurs when the leakage determination is being performed.

Figure 4:
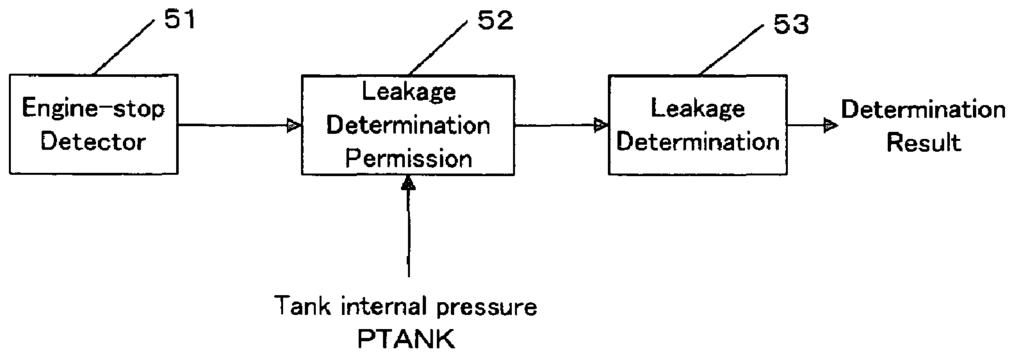
FIG. 4 shows a functional block diagram for a leakage determination apparatus in accordance with a first embodiment of the invention.

FIG. 4 shows a functional block diagram of a leakage determination apparatus in accordance with the first embodiment of the present invention. An engine-stop detector 51 determines whether the engine is stopped. If the engine is stopped and the tank internal pressure PTANK detected by the pressure sensor is less than a predetermined positive pressure, a leakage determination permission part 52 permits the execution of the leakage determination. The predetermined positive pressure is a pressure that makes it impossible to open the vent-shut valve, as described above.

The leakage determination permission part 52 may, of course, permit the leakage determination if other additional conditions are met. If the engine is operating or if the tank internal pressure detected by the pressure sensor is greater than the predetermined positive pressure, the leakage determination permission part 52 prohibits the leakage determination. A leakage determination part 53 performs the leakage determination as described above with reference to FIG. 2.

Figure 5:
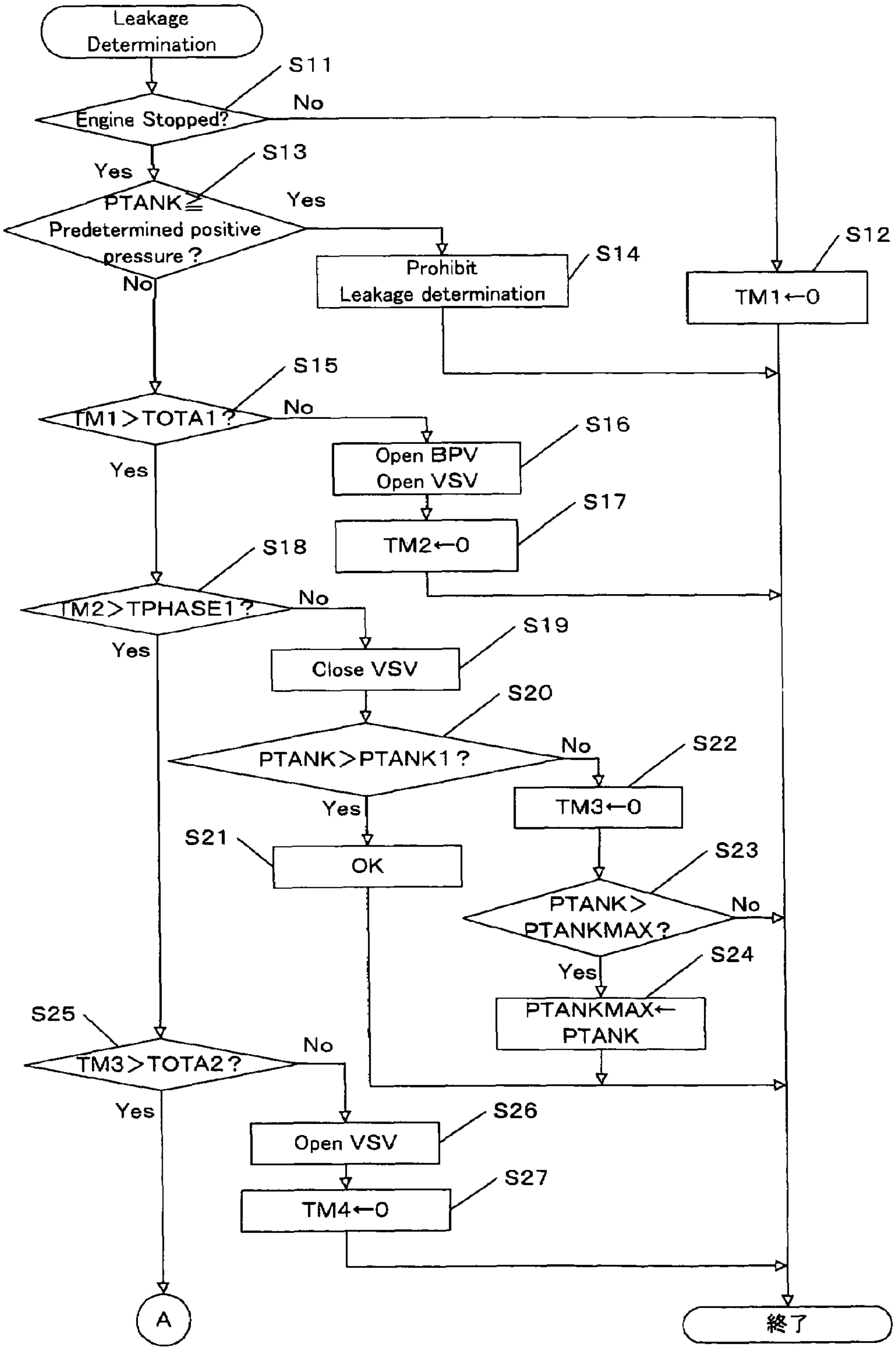
FIG. 5 shows a flowchart of a leakage determination process in accordance with a first embodiment of the invention.
Figure 6:
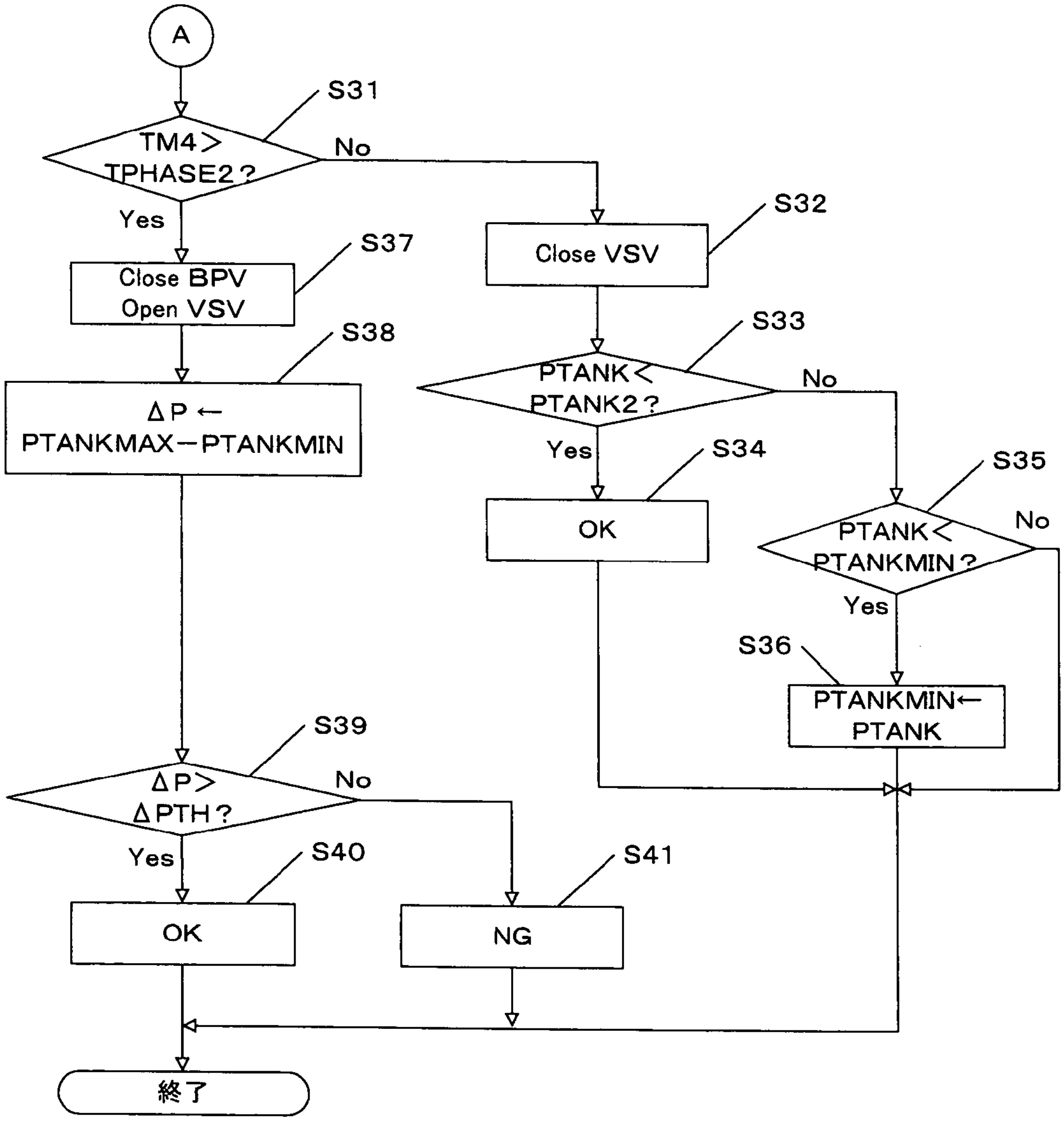
FIG. 6 shows a flowchart of a leakage determination process in accordance with a first embodiment of the invention.

FIGS. 5 and 6 show a flowchart of a process for performing the leakage determination in accordance with the first embodiment shown in FIG. 3. This process is carried out at a predetermined time interval (for example, 100 milliseconds).

In step S11, it is determined whether the engine 1 has been stopped. If the engine is in operation, the value of a first count-up timer TM1 is set to zero (S12), and the process exits the routine. The first count-up timer TM1 is a timer that measures the first open-to-atmosphere period TOTA1 (see FIG. 2).

If the engine 1 has been stopped, it is determined in step S13 whether the tank internal pressure PTANK is equal to or greater than a predetermined positive pressure. If the tank internal pressure is equal to or greater than the predetermined positive pressure, a state where the vent-shut valve 38 does not open may occur. Therefore, if the answer of the step 13 is "Yes," the leakage determination is prohibited (S14).

If the answer of the step 13 is "No," the process proceeds to step 15, in which it is determined whether the value of the first count-up timer TM1 has reached the predetermined first open-to-atmosphere period TOTAL. When the step S15 is first performed, the answer of the step is "No." The process proceeds to step S16, in which the bypass valve 36 is opened and the vent-shut valve 38 is held in an open state (at time t1 in FIG. 2). In step S17, the value of a second count-up timer TM2 is set to zero, and the process exits the routine. The second count-up timer TM2 is a timer that measures the first determination period TPHASE1.

If the value of the first count-up timer TM1 has reached the first open-to-atmosphere period TOTAL (at time t2 of FIG. 2) when the routine is re-entered, the process proceeds from step 15 to step S18, in which it is determined whether the value of the second count-up timer TM2 has reached the first determination period TPHASE1 (FIG. 2). When the step S18 is first performed, the answer of the step is "No." The process proceeds to step S19, in which the vent-shut valve 38 is closed. In step S20, it is determined whether the tank internal pressure PTANK is greater than the first determination value PTANK1.

When step S20 is first performed, the answer of the step is "No."The process proceeds to step S22, in which the value of a third count-up timer TM3 is set to zero. The third count-up timer TM3 is a timer that measures the second open-to-atmosphere period TOTA2 (FIG. 2).

In step S23, it is determined whether the tank internal pressure PTANK is higher than the maximum tank internal pressure PTANKMAX. The initial value of the maximum tank internal pressure PTANKMAX is lower than the atmospheric pressure. Therefore, when the step S23 is first performed, the answer of the step is "Yes." In step S24, the current tank internal pressure PTANK is set in the maximum tank internal pressure PTANKMAX. If the answer of the step S23 is "No," the process exits the routine. Thus, the maximum tank internal pressure PTANKMAX in the first determination mode is obtained.

If the answer of the step S20 is "Yes" (see the dashed line L1 and the time point t3 in FIG. 2), it is determined in step S21 that the evaporated fuel processing system has no leakage because the tank internal pressure PTANK has sharply increased. Thus, the leakage determination process is completed.

If the value of the second count-up timer TM2 has reached the first determination period TPHASE1 (at time t4 in FIG. 2) in step S18 when the routine is re-entered, the process proceeds to step S25. In step S25, it is determined whether the value of the third count-up timer TM3 has reached the second open-to-atmosphere period TOTA2. When the step S25 is first performed, the answer of the step is "No." The process proceeds to step S26, in which the vent-shut valve is opened (at time t4). In step S27, a fourth count-up timer TM4 is set to zero and the process exits the routine. The fourth count-up timer TM4 is a timer that measures the second determination period TPHASE2.

Figure 7:
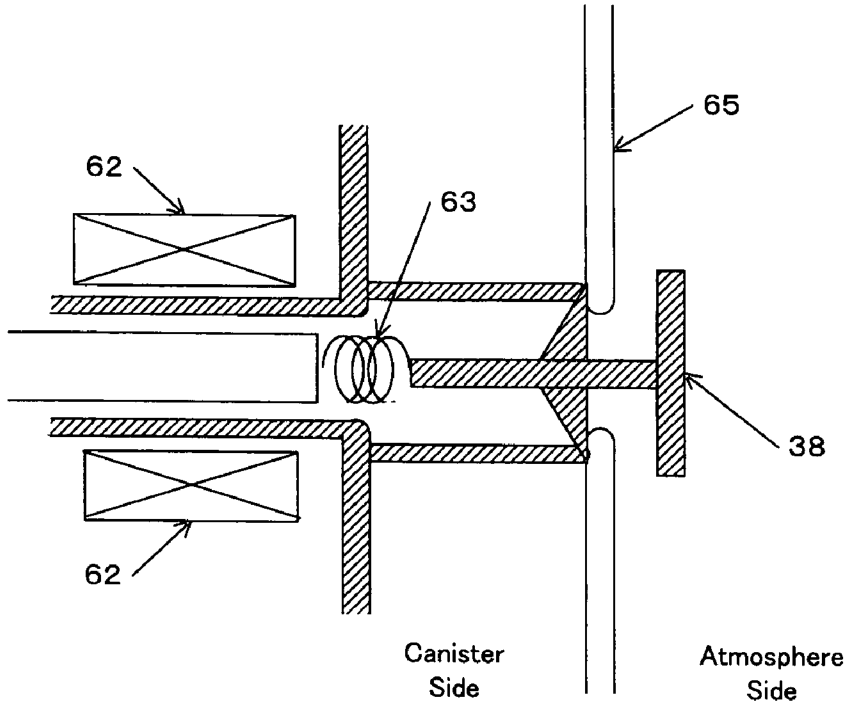
FIG. 7 shows a structure of a vent-shut valve in accordance with a second embodiment of the present invention.
Figure 7:
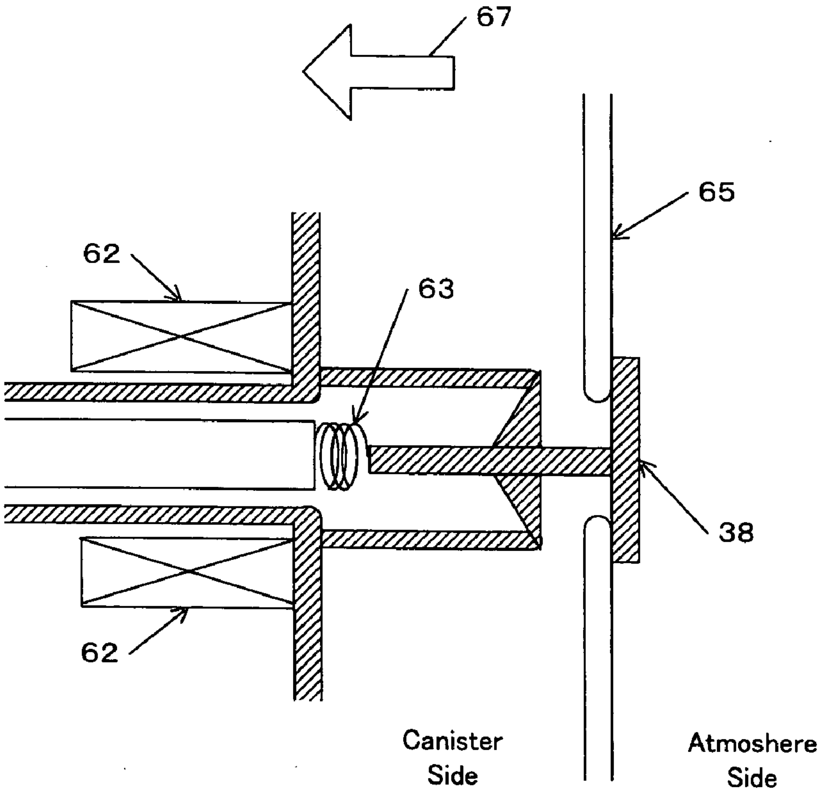

If the value of the third count-up timer TM3 has reached the second open-to-atmosphere period TOTA2 (at time t5 in FIG. 2) in step S25 when the routine is re-entered, the process proceeds to step S31 (FIG. 7). In step S31, it is determined whether the value of the fourth count-up timer TM4 has reached the second determination period TPHASE2. When the step S31 is first performed, the answer of the step is "No." The process proceeds to step S32, in which the vent-shut valve 38 is closed. In step S33, it is determined whether the tank internal pressure PTANK is less than the second determination value PTANK2.

Since the answer of the step S33 is "No" when the step is first performed, the process proceeds to step S35, in which it is determined whether the tank internal pressure PTANK is lower than the minimum tank internal pressure PTANKMIN. Since the initial value of the minimum tank internal pressure PTANKMIN is higher than the atmospheric pressure, the answer of the step S35 is "Yes" when the step S35 is first performed. In step S36, the current tank internal pressure PTANK is set in the minimum tank internal pressure PTANKMIN. If the answer of the step S35 is "No," the process exits the routine. Thus, the minimum tank internal pressure PTANKMIN is obtained in the second determination mode.

If the answer of the step S33 is "Yes" (see the dashed line L3 and the time point t6 in FIG. 2), it is determined in step S34 that the evaporated fuel processing system has no leakage because the tank internal pressure PTANK has sharply decreased. Thus, the leakage determination process is completed.

If the value of the fourth count-up timer TM4 has reached the second determination period TPHASE2 in step S31 (at time t7 in FIG. 2) when the routine is re-entered, the bypass valve 36 is closed and the vent-shut valve 38 is opened in step S37. In step S38, a difference ΔP between the maximum tank internal pressure PTANKMAX and the minimum tank internal pressure PTANKMIN is calculated. In step S39, it is determined whether the calculated difference ΔP is greater than the third determination value ΔPTH. If $\Delta P > \Delta PTH$, it is determined that the evaporated fuel processing system 50 is normal (S40). If $\Delta P \leqq \Delta PTH$, it is determined that the evaporated fuel processing system 50 has leakage (S41). The leakage determination process is completed.

Thus, according to the first embodiment, the leakage determination is prohibited when the evaporated fuel processing system exhibits an excessive positive pressure as shown in step S13 and step S14 of FIG. 5. Because it is prevented that a state where the vent-shut valve does not open occurs during the leakage determination, the leakage determination can be stably performed.

FIG. 7 shows a structure of the vent-shut valve 38 in accordance with a second embodiment of the present invention.

FIG. 7(*a*) shows the vent-shut valve 38 in an open state. FIG. 7(*b*) shows the vent-shut valve 38 in a closed state. A major difference from the vent-shut valve shown in FIG. 3 is in the location in which a spring 63 is provided. The spring 43 in the first embodiment of FIG. 3 is provided in the opposite side to the canister (that is, in the atmosphere side relative to a valve seat 45). In contrast, in the second embodiment of FIG. 7, the spring 63 is provided in the canister side relative to the valve seat 65.

If electric power is supplied to an electromagnet 62 when the vent-shut valve 38 is in an open state, the valve 38 is pulled toward a direction shown by arrow 67 against the biasing force of the spring 63. When the valve 38 is seated at the valve seat 65, a passage to the canister is closed. Thus, the pressure in the canister is maintained.

If the electric power supply to the electromagnet 62 is stopped when the pressure in the canister is maintained, the valve 38 moves in the opposite direction of the arrow 67 in accordance with the biasing force of the spring 63. When the valve 38 leaves the valve seat 65, the passage to the canister is opened.

At the time t4 at which the first determination mode is completed, the vent-shut valve 38 is opened. The valve 38 is opened only by the biasing force of the spring 63. When the tank internal pressure PTANK is a negative pressure at the time t4, the valve 38 does not open unless the biasing force of the spring 63 is greater than a force caused by this negative pressure. The force caused by the negative pressure is specifically shown by "the absolute value of the negative pressure×the area of the valve 38."

For example, if the pressure of the evaporated fuel processing system is greater than −2.66 kPa (−20 mmHg), the biasing force of the spring 63 is greater than a force caused by the pressure of the evaporated fuel processing system. Therefore, the valve 38 opens. If the pressure in the evaporated fuel processing system is less than −2.66 kPa (−20 mmHg), the vent-shut valve 38 does not open because the biasing force of the spring 63 cannot overcome the force caused by the negative pressure of the evaporated fuel processing system.

If the structure of the vent-shut valve 38 is determined, a negative pressure making it impossible to open the vent-shut valve can be pre-measured. According to the present invention, when the pressure in the evaporated fuel processing system is lower than the negative pressure that makes it impossible to open the vent-shut valve, the leakage determination is prohibited. Thus, it is prevented that a state in which the vent-shut valve 38 does not open occurs when the leakage determination is being performed.

The functional blocks of the leakage determination apparatus in accordance with the second embodiment are similar to those as shown in FIG. 4. If the engine is stopped and the tank internal pressure PTANK detected by the pressure sensor is greater than a predetermined negative pressure, a leakage determination permission part 52 according to the second embodiment permits the leakage determination The predetermined negative pressure is a pressure that makes it impossible to open the vent-shut valve as described above.

Figure 8:
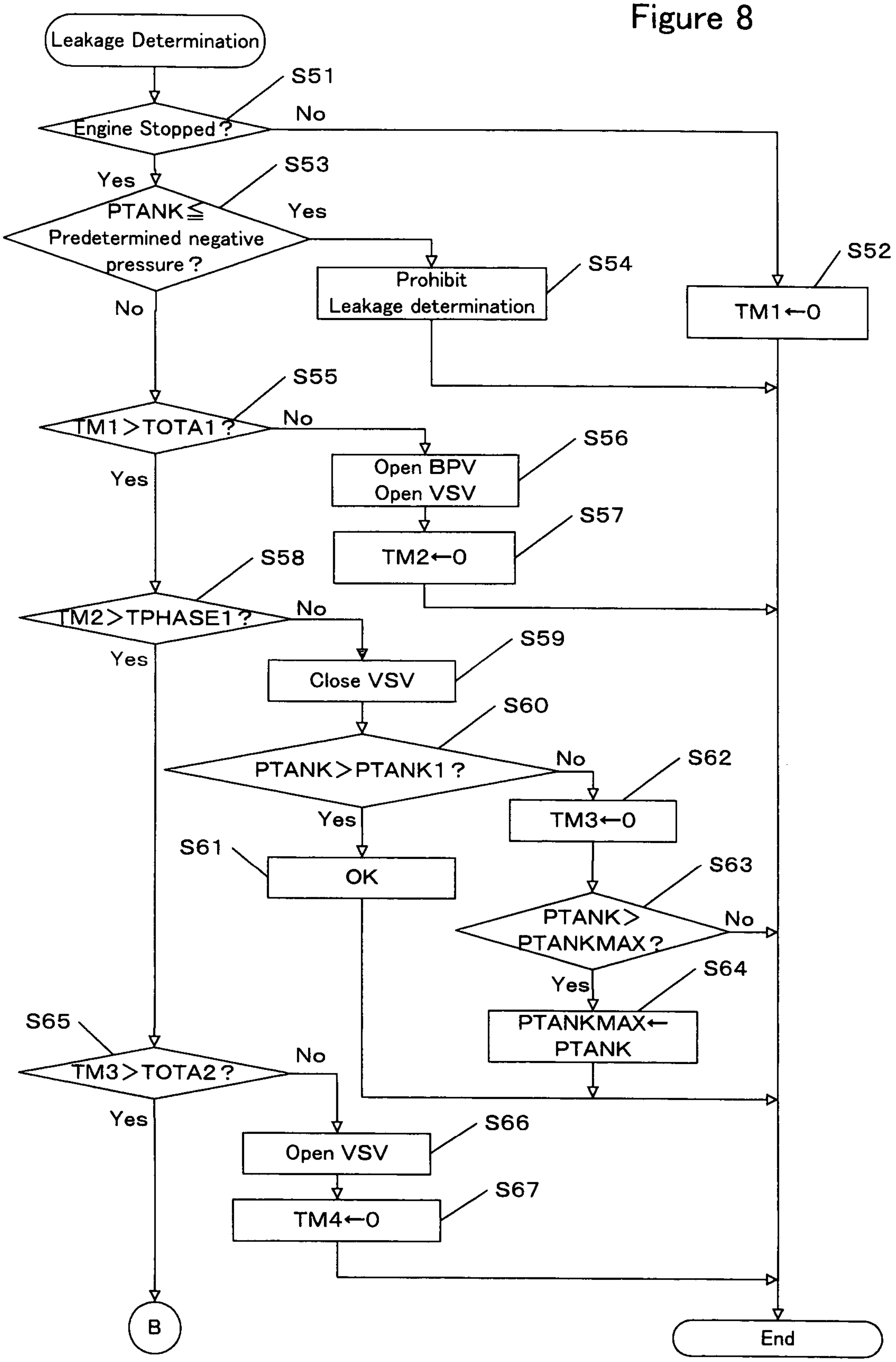
FIG. 8 shows a flowchart of a leakage determination process in accordance with a second embodiment of the invention.
Figure 9:
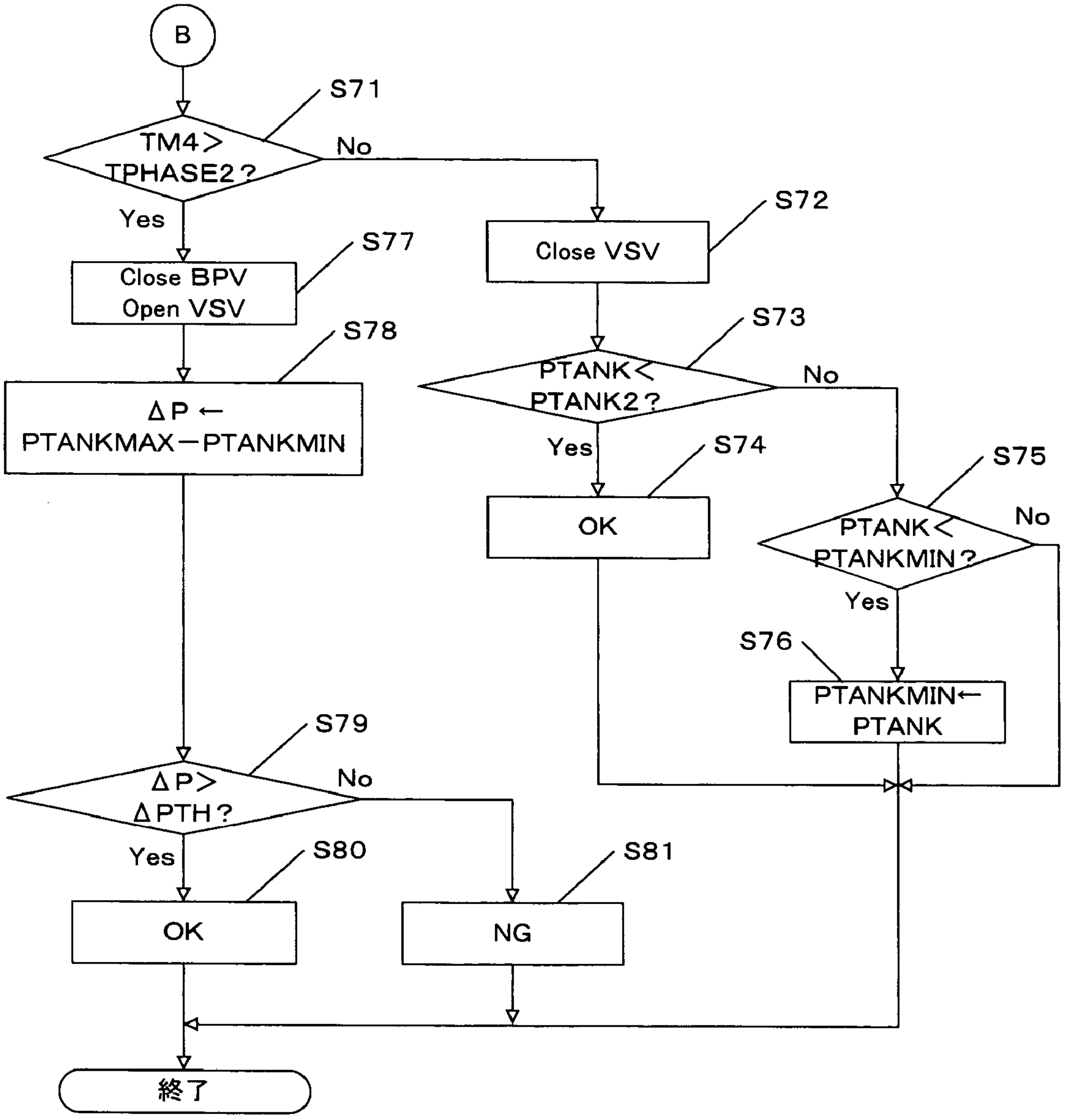
FIG. 9 shows a flowchart of a leakage determination process in accordance with a second embodiment of the invention.

FIGS. 8 and 9 show a flowchart of a process for performing the leakage determination. This flowchart is the same as the flowchart shown in FIGS. 5 and 6 except for step S53.

Step S53 will be described below. This routine is carried out at a predetermined time interval (for example, every 100 milliseconds). When this routine is entered, it is determined in step S53 whether the tank internal pressure PTANK is equal to or lower than a predetermined negative pressure. If the tank internal pressure is equal to or lower than the predetermined negative pressure, a state where the vent-shut valve 38 does not open may occur. Therefore, if the answer of the step S53 is "Yes," the leakage determination is prohibited in step S54. If the answer of the step S53 is "No," the process proceeds to step S55.

Thus, according to the second embodiment, when the evaporated fuel processing system exhibits an excessive negative pressure, the leakage determination is prohibited. Because it is prevented that a state where the vent-shut valve does not open occurs during the leakage determination, the leakage determination can be stably performed.

The invention may be applied to an engine to be used in a vessel-propelling machine such as an outboard motor in which a crankshaft is disposed in the perpendicular direction.

What is claimed is:

1. An apparatus for determining leakage in an evaporated fuel processing system, the evaporated fuel processing system extending from a fuel tank through a canister to a purge passage through which evaporated fuel from the fuel tank is purged to an intake manifold of an engine, the canister comprising a vent-shut valve that communicates with the atmosphere, the apparatus comprising:

a pressure sensor for detecting a pressure of the evaporated fuel processing system;

a control unit connected to the pressure sensor, the control unit configured to:

detect a stop of the engine;

close the vent-shut valve to close the evaporated fuel processing system after the stop of the engine is detected;

determine whether the evaporated fuel processing system has leakage after the evaporated fuel processing system is closed based on the detected pressure and a predetermined determination value; and prohibit the leakage determination if the detected pressure is not within a predetermined range, wherein the predetermined range is based on a pressure range within which the vent-shut valve can open.

2. The apparatus of claim 1, wherein the pressure range within which the vent-shut valve can open is based on a biasing force of a spring of the vent-shut valve.

3. The apparatus of claim 2, wherein the spring of the vent-shut valve is provided in the atmosphere side relative to a valve seat at which the vent-shut valve is seated, wherein the control unit is further configured to:

prohibit the leakage determination if the detected pressure is greater than a predetermined positive pressure.

4. The apparatus of claim 2, wherein the spring of the vent-shut valve is provided in the canister side relative to a valve seat at which the vent-shut valve is seated, wherein the control unit is further configured to:

prohibit the leakage determination if the detected pressure is lower than a predetermined negative pressure.

5. A method for determining leakage in an evaporated fuel processing system, the evaporated fuel processing system extending from a fuel tank through a canister to a purge passage through which evaporated fuel from the fuel tank is purged to an intake manifold of an engine, the canister comprising a vent-shut valve that communicates with the atmosphere, comprising the steps of:

detecting a pressure of the evaporated fuel processing system;

detecting a stop of the engine;

closing the vent-shut valve to close the evaporated fuel processing system after the stop of the engine is detected;

determining whether the evaporated fuel processing system has leakage after the evaporated fuel processing system is closed based on the detected pressure and a predetermined determination value; and prohibiting the leakage determination if the detected pressure is not within a predetermined range, wherein the predetermined range is based on a pressure range within which the vent-shut valve can open.

6. The method of claim 5, further comprising the step of defining the pressure range within which the vent-shut valve can open based on a biasing force of a spring of the vent-shut valve.

7. The method of claim 6, wherein the spring of the vent-shut valve is provided in the atmosphere side relative to a valve seat at which the vent-shut valve is seated, wherein the step of prohibiting the leakage determination further comprises the step of prohibiting the leakage determination if the detected pressure is greater than a predetermined positive pressure.

8. The method of claim 6, wherein the spring of the vent-shut valve is provided in the canister side relative to a valve seat at which the vent-shut valve is seated, wherein the step of prohibiting the leakage determination further comprises the step of prohibiting the leakage determination if the detected pressure is lower than a predetermined negative pressure.

9. A computer program stored on a computer readable medium for use in determining leakage in an evaporated fuel processing system, the evaporated fuel processing system extending from a fuel tank through a canister to a purge passage through which evaporated fuel from the fuel tank is purged to an intake manifold of an engine, the canister comprising a vent-shut valve that communicates with the atmosphere, the computer program comprising:

program code for receiving a pressure of the evaporated fuel processing system from a pressure sensor;

program code for detecting a stop of the engine;

program code for closing the vent-shut valve to close the evaporated fuel processing system after the stop of the engine is detected;

program code for determining whether the evaporated fuel processing system has leakage after the evaporated fuel processing system is closed based on the detected pressure and a predetermined determination value; and program code for prohibiting the leakage determination if the detected pressure is not within a predetermined range, wherein the predetermined range is based on a pressure range within which the vent-shut valve can open.

10. The computer program of claim 9, wherein the pressure range within which the vent-shut valve can open is based on a biasing force of a spring of the vent-shut valve.

11. The computer program of claim 10, wherein the spring of the vent-shut valve is provided in the atmosphere side relative to a valve seat at which the vent-shut valve is seated, wherein the program code for prohibiting the leakage determination further comprises program code for prohibiting the leakage determination if the detected pressure is greater than a predetermined positive pressure.

12. The computer program of claim 10, wherein the spring of the vent-shut valve is provided in the canister side relative to a valve seat at which the vent-shut valve is seated, wherein the program code for prohibiting the leakage determination further comprises program code for prohibiting the leakage determination if the detected pressure is lower than a predetermined negative pressure.

13. An apparatus for determining leakage in an evaporated fuel processing system, the evaporated fuel processing system extending from a fuel tank through a canister to a purge passage through which evaporated fuel from the fuel tank is purged to an intake manifold of an engine, the canister comprising a vent-shut valve that communicates with the atmosphere, the apparatus comprising:

a pressure sensor for detecting a pressure of the evaporated fuel processing system;

means for detecting a stop of the engine;

means for closing the vent-shut valve to close the evaporated fuel processing system after the stop of the engine is detected;

means for determining whether the evaporated fuel processing system has leakage after the evaporated fuel processing system is closed based on the detected pressure and a predetermined determination value; and means for prohibiting the leakage determination if the detected pressure is not within a predetermined range, wherein the predetermined range is based on a pressure range within which the vent-shut valve can open.

14. The apparatus of claim 13, wherein the pressure range within which the vent-shut valve can open is based on a biasing force of a spring of the vent-shut valve.

15. The apparatus of claim 14, wherein the spring of the vent-shut valve is provided in the atmosphere side relative to a valve seat at which the vent-shut valve is seated, wherein the means for prohibiting the leakage determination further comprises means for prohibiting the leakage determination if the detected pressure is greater than a predetermined positive pressure.

16. The apparatus of claim 14, wherein the spring of the vent-shut valve is provided in the canister side relative to a valve seat at which the vent-shut valve is seated, wherein the means for prohibiting the leakage determination further comprises means for prohibiting the leakage determination if the detected pressure is lower than a predetermined negative pressure.

* * * * *